United States Patent
Gebhardt

(10) Patent No.: US 10,227,912 B2
(45) Date of Patent: Mar. 12, 2019

(54) GAS ENGINE

(71) Applicant: Liebherr-Machines Bulle SA, Bulle (CH)

(72) Inventor: Thomas Gebhardt, Bulle (CH)

(73) Assignee: Liebherr-Machines Bulle SA, Bulle (CH)

(*) Notice: Subject to any disclaimer, the term of this patent is extended or adjusted under 35 U.S.C. 154(b) by 102 days.

(21) Appl. No.: 14/902,540

(22) PCT Filed: Jul. 3, 2014

(86) PCT No.: PCT/EP2014/001844
§ 371 (c)(1),
(2) Date: Dec. 31, 2015

(87) PCT Pub. No.: WO2015/000599
PCT Pub. Date: Jan. 8, 2015

(65) Prior Publication Data
US 2016/0208679 A1 Jul. 21, 2016

(30) Foreign Application Priority Data

Jul. 4, 2013 (CH) .................................. 1217/13

(51) Int. Cl.
*F02B 33/40* (2006.01)
*F02B 29/04* (2006.01)
(Continued)

(52) U.S. Cl.
CPC ............... *F02B 33/40* (2013.01); *F01N 5/04* (2013.01); *F02B 29/0418* (2013.01);
(Continued)

(58) Field of Classification Search
CPC ........ F02B 33/40; F02B 37/007; F02B 61/04; F02B 61/00; F02B 37/183; F02B 37/004;
(Continued)

(56) References Cited

U.S. PATENT DOCUMENTS 5,899,070 A * 5/1999 Droessler ............ F02B 37/005
60/612
6,418,723 B1 * 7/2002 Gladden ............... F02B 37/013
415/120
(Continued)

FOREIGN PATENT DOCUMENTS

CA 2 549 215 A1 12/2007
JP 2006241979 A * 9/2006 ............ F02B 37/007
WO WO 2009/064971 A1 5/2009

OTHER PUBLICATIONS

International Search Report (PCT/ISA/210) issued in International Application No. PCT/EP2014/001844 dated Oct. 21, 2014, with English translation (Five (5) pages).
(Continued)

Primary Examiner — Jason Newton
(74) Attorney, Agent, or Firm — Crowell & Moring LLP

(57) ABSTRACT

A gas engine includes a mixing unit for mixing two gas components, which are fed to one or more combustion chambers of the gas engine, in particular for mixing fuel gas and charge air, as well as two compressors. By way of the compressors, the two gas components are separately compressed before the two gas components are fed to the mixing unit. Both compressors are driven by a turbine arranged in the exhaust gas system of the gas engine.

6 Claims, 3 Drawing Sheets

(51) Int. Cl.
*F02M 21/02* (2006.01)
*F02M 21/04* (2006.01)
*F01N 5/04* (2006.01)
*F02B 37/00* (2006.01)
*F02D 41/00* (2006.01)
*F02B 37/007* (2006.01)
*F02B 37/18* (2006.01)
*F02B 61/00* (2006.01)
*F02B 61/04* (2006.01)
*F02D 19/02* (2006.01)

(52) U.S. Cl.
CPC .......... *F02B 37/001* (2013.01); *F02B 37/004* (2013.01); *F02B 37/007* (2013.01); *F02B 37/183* (2013.01); *F02B 61/00* (2013.01); *F02B 61/04* (2013.01); *F02D 41/0007* (2013.01); *F02D 41/0027* (2013.01); *F02M 21/0245* (2013.01); *F02M 21/04* (2013.01); *F02D 19/021* (2013.01); *Y02T 10/144* (2013.01); *Y02T 10/146* (2013.01); *Y02T 10/16* (2013.01); *Y02T 10/32* (2013.01)

(58) Field of Classification Search
CPC ................ F02B 37/001; F02B 29/0418; F02D 41/0027; F02D 41/0007; F02D 19/021; F01N 5/04; F02M 21/0245; F02M 21/04; Y02T 10/32; Y02T 10/16; Y02T 10/144; Y02T 10/146
USPC ......................................... 60/602, 612, 605.1
See application file for complete search history.

(56) References Cited

U.S. PATENT DOCUMENTS

| | | | | |
|---|---|---|---|---|
| 7,461,507 | B2* | 12/2008 | Arnold | F01D 17/143 60/605.1 |
| 9,556,792 | B2* | 1/2017 | Frampton | F02D 9/105 |
| 9,828,947 | B2* | 11/2017 | Nishio | F02M 21/04 |
| 2005/0205022 | A1* | 9/2005 | Ito | F02D 19/029 123/27 GE |
| 2006/0042241 | A1* | 3/2006 | Bright | B60W 30/184 60/431 |
| 2006/0204909 | A1* | 9/2006 | Malm | F02B 43/10 431/12 |
| 2008/0147303 | A1* | 6/2008 | Ito | F02D 19/029 701/111 |
| 2009/0076709 | A1* | 3/2009 | Shiraishi | F02D 31/007 701/103 |
| 2010/0126170 | A1* | 5/2010 | Nishio | F02M 21/047 60/611 |
| 2011/0247589 | A1* | 10/2011 | Shimizu | F02D 23/00 123/445 |
| 2012/0227397 | A1* | 9/2012 | Willi | F02B 41/10 60/605.1 |
| 2013/0055712 | A1* | 3/2013 | Shimizu | F02B 19/1004 60/602 |
| 2013/0067913 | A1* | 3/2013 | Nishio | F02M 33/04 60/599 |
| 2013/0101401 | A1* | 4/2013 | Shimizu | F01D 11/04 415/175 |
| 2013/0133616 | A1* | 5/2013 | Klingbeil | F02D 19/081 123/304 |
| 2013/0133630 | A1 | 5/2013 | Watanabe | |
| 2013/0174800 | A1* | 7/2013 | Malm | F02B 75/00 123/1 A |
| 2013/0220278 | A1* | 8/2013 | Nishio | F02M 21/04 123/478 |
| 2013/0276433 | A1* | 10/2013 | Yamasaki | F02C 7/08 60/286 |
| 2014/0000255 | A1* | 1/2014 | Suzuki | F02D 9/02 60/599 |
| 2014/0250892 | A1* | 9/2014 | Kurosaka | F02C 3/22 60/737 |
| 2014/0373531 | A1* | 12/2014 | Wong | F02B 43/02 60/605.1 |

OTHER PUBLICATIONS

German-language Written Opinion (PCT/ISA/237) issued in International Application No. PCT/EP2014/001844 dated Oct. 21, 2014 (Five (5) pages).

\* cited by examiner

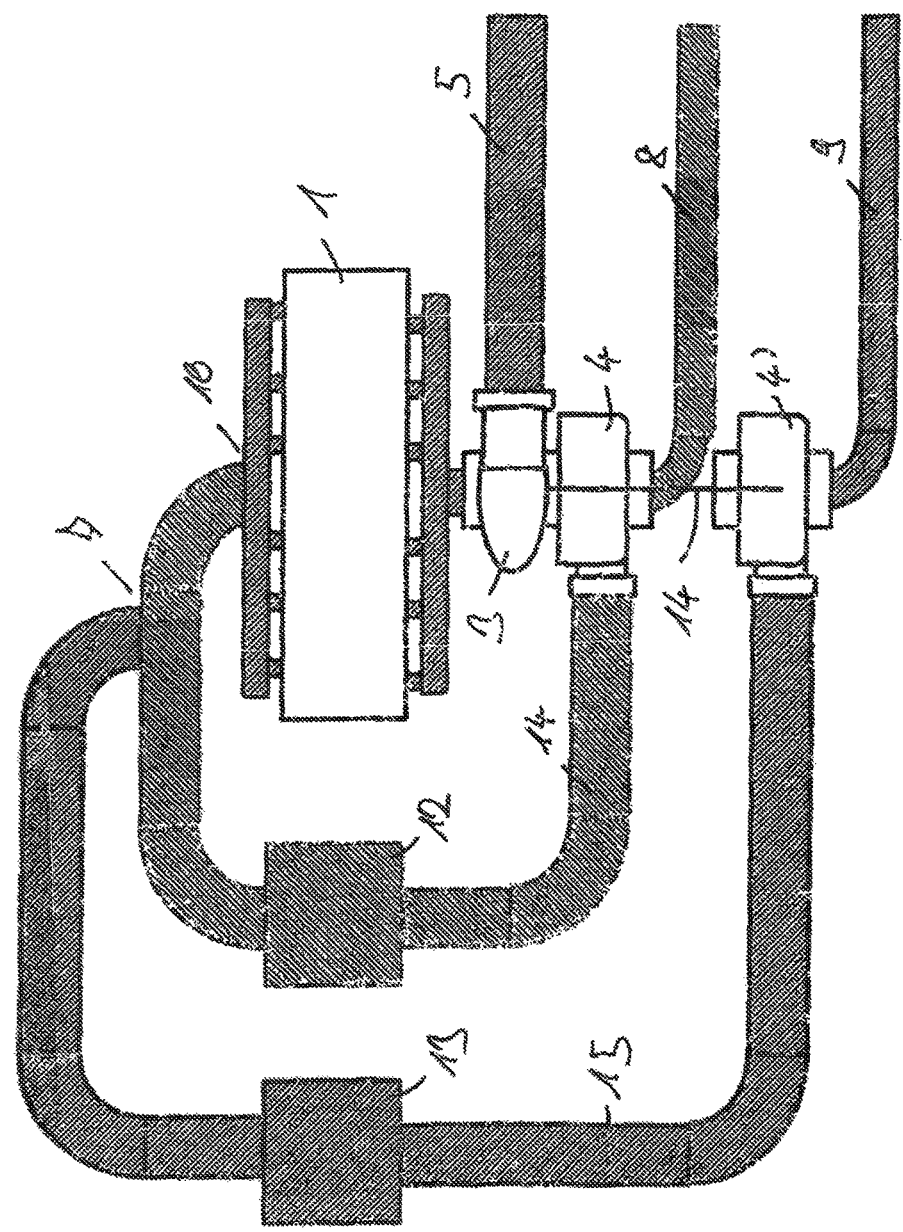

GAS ENGINE

BACKGROUND OF THE INVENTION

1. Field of the Invention

The present invention relates to a gas engine with a mixing unit for mixing two gas components, which are supplied to one or more combustion chambers of the gas engine, in particular for mixing fuel gas and charge air. In particular, the present invention thereby relates to gas engines with an exhaust gas turbocharger for charging at least one of the gas components.

2. Description of Related Art

In FIGS. 1a and 1b are shown two variants known from the prior art of how a mixture formation of fuel gas and charge air may be implemented in a gas motor with an exhaust gas turbocharger. Here is respectively shown an internal combustion engine 1 with an exhaust gas turbocharger 2, which consists of a turbine 3 arranged in an exhaust gas line 5 and a compressor 4 arranged from the turbine. The feeding of the charge air occurs here via a feed line 8, the feeding of the fuel gas via a feed line 9.

In the arrangement shown in FIG. 1a, the mixture formation takes place in an unpressurized region, for example via a venturi gas mixer. The gas mixer 7 is therefore positioned in the charge air line before the compressor 4.

However, it is advantageous for the most precise and dynamic lambda control if the position of the mixture formation can be realized as nearly before the combustion chambers as possible and thus after the compressor 4. However, an unpressurized injection of the fuel gas into the intake air is no longer possible there.

In the arrangement shown in FIG. 1b, in which the mixing unit 7 is arranged downstream from the compressor 4 in the intake path, the fuel gas 9 must therefore also be compressed. In known arrangements, this occurs by means of a mechanical or electrical pump 10. However, an optimal efficiency of the overall system is thus unattainable.

The object of the present invention is therefore to improve known gas engines, in particular with regard to efficiency.

SUMMARY OF THE INVENTION

This object is achieved according to the invention by a gas engine as claimed.

The gas engine according to the invention comprises a mixing unit for mixing at least two gas components, which are supplied to one or more combustion chambers of the gas engine. Furthermore, the gas engine has at least two compressors, via which the two gas components can be compressed separately before being supplied to the mixing unit. According to the invention, the two compressors are driven here by at least one turbine arranged in the exhaust line of the gas engine. In particular, the two gas components here may be charge air and fuel gas.

The present invention thus enables a separate compression of intake air and fuel gas, so that the mixing of the media can take place as close as possible to the combustion chamber. This results in improved mixture control with regard to dynamics, precision and cylinder equalization. Furthermore, the compression of the fuel gas can be carried out according to the invention with an efficiency which is superior to known processes, as an exhaust gas turbocharger may be used for the compression of both gas components.

Thus, according to the invention, the principle of an exhaust gas turbocharger is used not only for charge air, but also separately for fuel gas. Here, at least one turbine is provided, which is driven by the exhaust gas of the engine and which drives the two separate compressors for the two gas components.

According to the invention, media other than fuel gas and charge air, and/or optionally still further gas components, may also be separately compressed and/or mixed only after compression.

Furthermore, more than two gas components may also be separately compressed by compressors, which are driven by at least one turbine arranged in the exhaust line.

The present invention is thus based on a compression of the intake air and the fuel gas by means of one or more exhaust gas turbochargers, whereby the two mediums remain separated during compression. As a result, an improved mixture control is achieved, as the control of mixture formation takes place closer to the combustion chambers. The compression of the pure fuel gas is carried out separately, but with a superior efficiency relative to the currently existing methods. The machine described consists functionally of two pumps, which act on two or more media—air and one or more gaseous fuel—and which are driven via one or two turbines by means of the exhaust gas of the engine. A combination for the separate compression of further media would also be possible following the same principle.

In a first embodiment of the present invention, the two compressors are driven jointly by one turbine. This embodiment has the advantage that a doubling of components is not necessary on the drive side. Further, the speeds of the two compressors for the two gas components, in particular for fuel gas and charge air, are fixedly coupled with one another. Therefore, there is no need for a separate control of the two components. In a particularly preferred embodiment, the two compressors and the turbine are arranged on a common shaft. This results in a particularly simple construction.

In a second embodiment, the two compressors are driven separately from one another by two turbines arranged in the exhaust gas flow. Here, however, a somewhat greater effort in terms of construction is required. However, use may be made of standard components, as de facto two exhaust gas turbochargers are used, of which one compresses the first gas component and the other compresses the other gas component. The two turbines of this exhaust gas turbo charger are both arranged in the exhaust gas stream and are thus driven by the exhaust gas of the internal combustion engine.

In a first variant, both turbines are arranged in series in the exhaust gas stream. The exhaust gas thus flows through the two turbines one after the other.

In an alternative embodiment, however, the two turbines are arranged in parallel in the exhaust gas stream. A control arrangement, for example a valve assembly or flap, is preferably provided, via which the proportion of the exhaust gas stream which flows through the first and second turbine can be controlled.

In all inventive embodiments, one or more bypasses for the turbine or turbines may be arranged in the exhaust gas stream. Here, a respective control arrangement, for example a valve assembly or flap, is provided, by means of which the exhaust gas flow through the bypass or bypasses can be controlled.

If the two turbines are arranged in series, it is then advantageous to associate a bypass to each respective turbine, in order to separately control the exhaust gas flow through the respective turbines. Through separately arranged bypass lines, the exhaust gas flows can be independently controlled through both turbines. Thus, both the absolute boost pressure and the mixing ratio can be regulated (via the ratio of air and fuel gas boost pressure) with maximum efficiency. Alternatively, however, it is also conceivable to provide a single bypass which bridges both series-connected turbines. Thus, the exhaust gas stream would be controlled through both turbines by one controller.

In an arrangement with two parallel turbines, the bypass is advantageously arranged parallel to the two turbines.

If only one turbine is provided for driving both compressors, this turbine then preferably also has a bypass, via which the rotational speed of the turbine can be controlled.

Here, the gas engine preferably has a controller which controls the current through the bypass or bypasses and/or the rotational speed of the turbine or turbines.

Preferably, the two compressors are designed such that the charge air is compressed to 1.5 to 6 bar overpressure, while the fuel gas is compressed to a pressure which is higher by a factor of 2 to 4. The absolute boost pressure and the ratio of the two boost pressures is dependent on the desired mixing and control behavior and on the mixing ratio (λ). Optionally, a controller may be provided which drives the compressor and the turbines accordingly.

Furthermore, the gas engine according to the invention may have at least one cooler arranged between one of the compressors and the mixing unit or after the mixing unit. In one embodiment variant, respective coolers are arranged between both compressors and the mixing unit. In particular, a charge air cooler may be provided between the compressor and the mixing unit in the charge air line, and/or a fuel gas cooler may be provided between the compressor and the mixing unit in the fuel gas line. Here, the two coolers may form an integral unit. In an alternative embodiment, the cooler may be implemented as a mixture cooler between the mixing unit and combustion chamber.

In a first variant according to the invention, the mixing unit is arranged in front of a junction of the intake path for the individual combustion chambers. There is thus a central tube injection of the pressurized fuel gas at a desired position between the compressor for the charge air and the junction of the intake path.

Alternatively, the mixing unit may have at least two mixing regions, which are respectively arranged after a junction of the intake path for the individual combustion chambers. Particularly preferably, an injection of the pressurized fuel gas then occurs directly into the respective intake channel of each individual cylinder. In this variant, a junction thus occurs in both the charge air line as well as the fuel gas line.

The gas engine preferably has a controller, through which the air-fuel relationship of the resulting mixture can be controlled and/or regulated. The control is preferably effected by controlling the mixing unit and/or the exhaust gas turbocharger.

The present invention is used particularly preferably in gas engines which are designed to operate with a stoichiometric or over- or under-stoichiometric mixture. In particular, the mixture of the charge air and fuel gas occurs in such a manner that the resulting mixture is adjusted particularly precisely and stably to a desired mixing ratio. Here, a controller may be provided which controls the mixing unit and/or the individual components of the turbocharger such that a desired air/fuel mixture results. A mixture regulation is preferably carried out by means of feedback of the signal of an air-fuel sensor or through other direct or indirect determination of the mixture ratio by means of other suitable methods (for example boost pressure or combustion chamber temperature regulation).

The present invention can be used here in gas engines which operate according to the Otto principle, or those which operate according to the diesel principle.

In a first variant, the gas engine has at least one spark plug for igniting the mixture in the combustion chamber.

In further embodiments, the gas engine has at least one fuel oil injection for igniting the mixture in the combustion chamber and/or at least one glow plug in the combustion chamber.

According to the invention, any gaseous propellant may be used as fuel gas, for example natural gas, biogas, synthetic gas, LNG, LPG, CNG, etc. As described above, the fuel gas here is compressed separately from the charge air, either with a second turbocharger or via a single turbocharger combined from one turbine and two compressors. The energy in the exhaust gas stream is thus used according to the invention both for the compression of the intake air as well as separately for the compression of the gaseous propellant.

The result is that with the separate compression according to the invention of intake air and fuel gas, the same total amount of gas is achieved with a similar pressure ratio as would be the case with a common compression of an air-gas mixture. There is thus a comparable overall efficiency of the turbocharger, and thus a significant improvement of the motor or system efficiency as compared to current systems with gas injection.

In addition to the gas engine, the present invention further comprises a method for operating a gas engine, in which the energy in the exhaust stream is used to compress two gas components, in particular fuel gas and charge air, separately from one another, before they are mixed.

Here, the method according to the invention is preferably carried out as described above with respect to the gas engine.

Particularly preferably, the method according to the invention is a method for operating a gas engine, as already described above.

The gas engine according to the invention as well as the method according to the invention may be used in a variety of different applications.

The present invention comprises in particular a stationary device with a gas motor, as described above. Preferably, the gas engine drives an electric generator and/or a hydraulic pump. Here, the gas engine is particularly preferably connected to a stationary gas supply. In particular, the fuel gas may be supplied from a gas supply network and/or a gas tank.

Furthermore, the present invention comprises a boat with a gas engine as described above. In particular, the gas engine thereby drives the propeller. The gas is preferably fed from a gas tank to the gas engine.

The present invention further comprises a transport vehicle with a gas engine as described above. In particular, the transport vehicle is used for the transporting of people and/or the transporting of goods. In particular, the transport vehicle may be a bus or truck. The gas engine preferably drives a chassis of the transport vehicle.

The present invention further comprises a drivable work tool with a gas engine as described above. In particular, the gas engine may be used for driving a chassis and/or work equipment. It may be provided here that the gas engine drives a hydraulic pump of a hydraulic system. In turn, the hydraulic system may be used to drive a chassis and/or work equipment of the work tool.

Regardless of the application, the fuel gas can be stored in a tank and fed from the tank to the compressor. Alternatively, the gas may also be provided via a gas supply network. In particular, a stationary gas line to a gas supply system may be provided.

The present invention will now be described in more detail with reference to exemplary embodiments and drawings.

BRIEF DESCRIPTION OF THE DRAWINGS

FIG. 3 shows a second embodiment of the present invention in which the separate compression of fuel gas and intake air is carried out by means of a combined turbocharger, in which two compressors are driven by a common turbine.

DETAILED DESCRIPTION OF THE INVENTION

For a precise and dynamic lambda control, it is necessary to realize the position of the mixture formation of fuel gas and charge air as nearly before the combustion chambers as possible. This is possible with the introduction of the fuel gas into the intake system (central tube injection at a desired position between the compressor and junction of the intake path), or through a port injection, i.e. injection directly into the intake channel of each individual cylinder. As according to the invention the charge air is pressurized by means of an exhaust gas turbocharger, it is necessary for the injection of the fuel gas to likewise compress this, for example to a pressure between 8 and 12 bar.

Figure 1A:
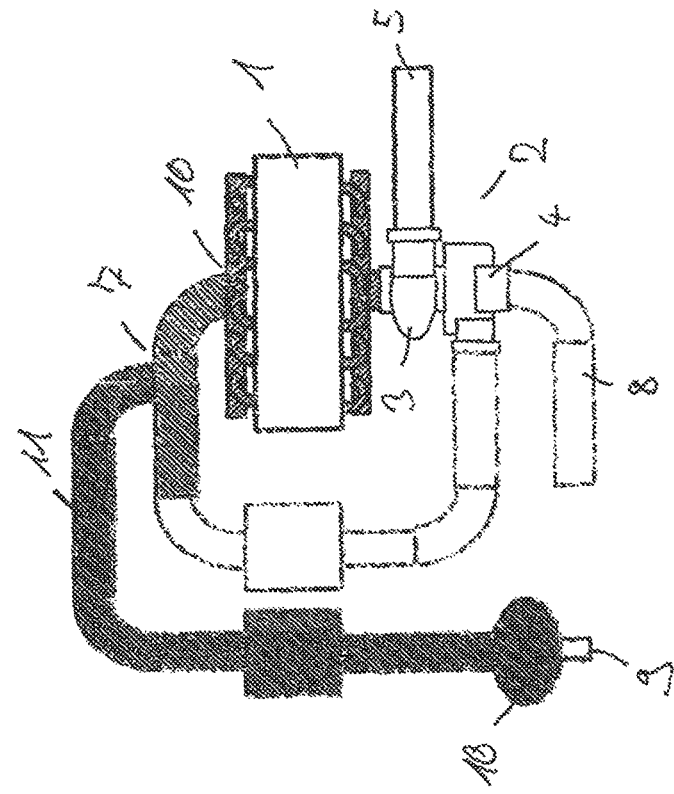
FIG. 1A shows a first variant of a gas engine according to the prior art, in which mixture formation takes place by means of a venturi nozzle upstream from the compressor of the exhaust gas turbocharger.
Figure 1B:
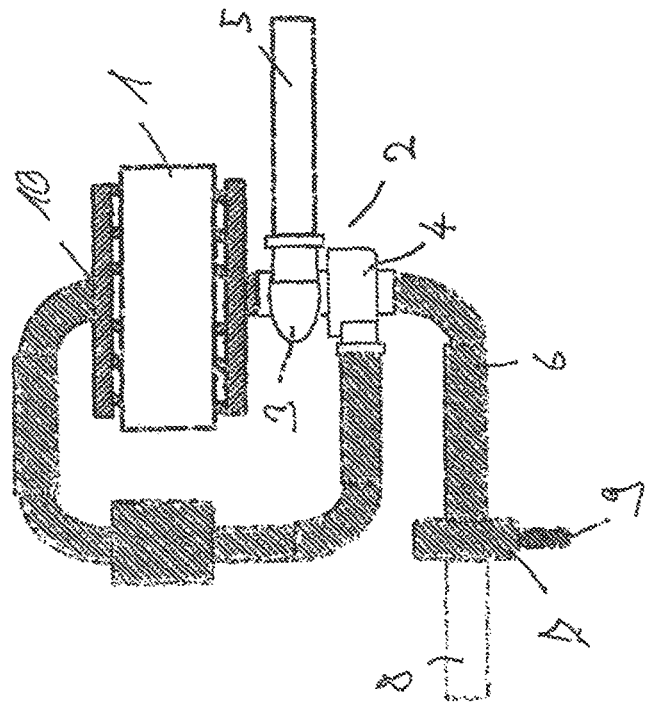
FIG. 1B shows a gas engine according to the prior art, in which mixture formation takes place after the exhaust gas turbocharger, wherein the fuel gas is compressed electrically or mechanically.
Figure 2:
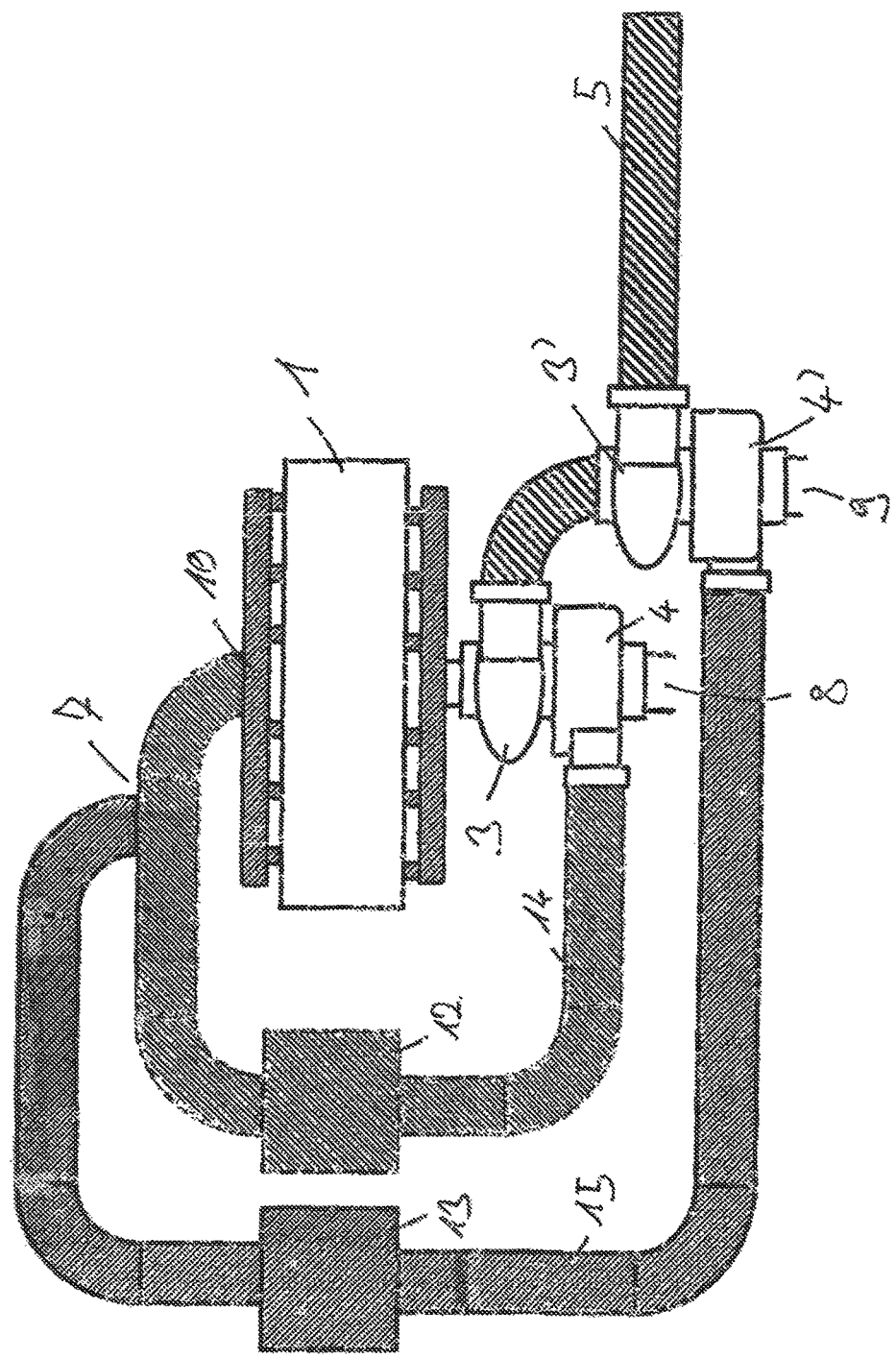
FIG. 2 shows a first embodiment of the present invention in which the separate compression of fuel gas and intake air is carried out by means of two exhaust gas turbochargers, which are connected in series

In the embodiments shown in FIGS. 2 and 3, a gas engine is provided, in the exhaust gas line of which is arranged at least one exhaust gas turbocharger with at least one turbine 3, which is driven by the exhaust gas flowing from the internal combustion engine 1 through the exhaust gas line 5. Here, the turbine 3 drives at least one compressor 4, by means of which the charge air supplied via the charge air supply 8 is compressed and guided via the intake path 14 to the combustion chambers of the internal combustion engine 1. The internal combustion engine 1 has a plurality of combustion chambers, wherein the charge air is supplied via the junction 10 of the intake path to the individual combustion chambers or cylinders.

In both embodiments, the injection of the fuel gas occurs via a mixing unit 7, which is provided downstream from the compressor 4 in the intake path 14. In the exemplary embodiment, the mixing unit 7 is arranged upstream from the junction 10 of the intake path. Alternatively, the mixing unit may also be arranged downstream from the junction 10, so that injection occurs directly into the respective intake channels of the individual cylinders. For this purpose, the fuel gas line 15 would require a corresponding junction.

According to the invention, the intake air and the fuel gas are compressed with one combined or two separate exhaust gas turbochargers, before the two components are supplied to the mixing unit 7. The energy in the exhaust gas stream is thus used both for the compression of the intake air as well as separately for the compression of the propellant. As a gaseous propellant may be used, for example, natural gas, biogas, synthetic gas, LNG, LPG, CNG and the like.

The separate compression of the fuel gas according to the invention may take place as shown in FIG. 2 by means of a second turbocharger, which is arranged in the exhaust gas stream upstream or downstream from the turbocharger for the exhaust air, or parallel therewith. In the embodiment of the present invention shown in FIG. 2, in addition to the first exhaust gas turbocharger of a turbine 3 and a compressor 4, a second exhaust gas turbocharger of a turbine 3' and a compressor 4' is provided, via which the fuel gas is compressed. In the exemplary embodiment, the turbine 3' of the second exhaust gas turbocharger is arranged in series with the turbine 3 of the first exhaust gas turbocharger in the exhaust gas line 5 and is downstream from the first turbine 3. However, a reverse arrangement or a parallel arrangement of the two turbines is also conceivable. Here, the second turbocharger compresses the fuel gas supplied via the fuel gas supply 9 and guides it via the fuel gas line 15 to the mixing unit 7, where the pressurized fuel gas is injected into the pressurized charge air.

Alternatively, the separate compression of the fuel gas and the charge air may take place by means of a single combined turbocharger which consists of one turbine and two compressors, as is shown in FIG. 3. Here, the turbine 3 drives both the compressor 4 for the charge air and the compressor 4' for the fuel gas. The two compressors 4 and 4' may thereby be installed on a common shaft with the turbine 3. In this embodiment, the second compressor replaces, for example, a drive of the exhaust gas turbocharger shaft, which in known exhaust gas turbochargers may drive an electric generator for example. Here, too, use may be made of standard components. The pressure ratio and thus the mixing behavior of the various component gases can be adjusted via the dimensions of the individual components (1 or more turbines, 2 or more compressors).

In the embodiments shown in FIGS. 2 and 3, respective coolers 12 and 13 are provided in the pressure lines 14 and 15 for the pressurized fuel gas and the pressurized charge air. These may optionally also form an integral unit. Furthermore, an arrangement of the cooler as a mixture cooler in the intake path after the admixing of the fuel gas is possible. The result is that with the separate compression according to the invention of intake air and fuel gas, the same total amount of gas is achieved with a similar pressure ratio as with a common compression of an air-gas mixture. This results in a comparable overall efficiency of the turbocharger to that in a system with mixing in an unpressurized area, wherein however the mixture formation occurs closely before the combustion chambers and thus enables a precise and dynamic lambda control. The compression pressure of the fuel gas may be higher than the compression pressure of the air. Likewise, embodiments are possible in which the compression pressure of the air is higher in relation to the compression pressure of the fuel gas.

Thus, the present invention results in an improved engine efficiency with a high precision of the mixture control. This has considerable advantages, in particular in a dynamic operation and/or with the use of liquid gas.

The mixing unit 7 preferably has a controller, via which the air-fuel ratio can be controlled and/or regulated, in particular by regulating the amount of pressurized fuel gas which is supplied to the charge air, and/or by means of control of the amount of air. The regulation and/or control of the amount of air or the amount of fuel gas is accompanied by the adjustment of the individual compression pressures of the different gases, i.e. the air and one or more fuel gases.

Preferably, the mixing unit is constructed so that the amount of one gas component, in particular the fuel gas, which is injected into the other gas component, in particular the charge air, can be controlled. Here, the gas engine preferably has a controller, which controls the mixing unit such that the mixture of fuel gas and charge air, which is supplied to the combustion chambers of the gas engine, has a predetermined air-fuel ratio. Particularly preferably, the controller is designed such that the air-fuel ratio in stationary or preferably also in dynamic operation can be adjusted in a stable and exact manner to a stoichiometric or other desired (over- or under-stoichiometric) value.

If two separate exhaust gas turbochargers are used for pressurizing the charge air and the fuel gas, a control or regulation of the air-fuel ratio may occur through controlling the respective exhaust gas turbocharger. In particular, this control of the exhaust gas turbocharger may take place by means of controlling the exhaust gas flow through the two turbines of the exhaust gas turbocharger, in particular by controlling the control arrangements in the corresponding bypasses. Optionally, the control of the exhaust gas turbocharger can be connected with a control for the mixing unit. In both the embodiment with one turbine and with two or more turbines, a control and/or regulation of the individual gas streams or pressures by means of one and more compressor bypasses is also possible.

Preferably, the present invention is used in stoichiometrically or over-stoichiometrically operated engines, however use in under-stoichiometrically operated engines is also possible.

In particular, the mixing unit and the individual components of the turbocharger are thereby controlled such that a stable, exact mixture of one or more fuel gases and charge air controlled and/or regulated at a desired value results.

The gas engines may be used on the one hand for stationary operation, for example as a drive for a generator or a pump. Further, the possibility exists of a mobile application, for instance as a drive for a construction or handling machine or in the area of marine applications, in particular for the driving of boats.

The invention claimed is:

1. A gas engine comprising:
   a mixing unit for mixing fuel gas and charge air supplied to individual combustion chambers of the gas engine, the mixing unit arranged upstream of a junction of intake paths for each of the individual combustion chambers,
   two compressors, each of the two compressors compressing one of the fuel gas and the charge air separately from the other of the fuel gas and the charge air before the fuel gas and the charge air are supplied to the mixing unit, and
   two turbines arranged in an exhaust gas line of the gas engine, each of the two compressors being driven by one of the two turbines.

2. The gas engine according to claim 1, wherein the two compressors are driven separately from one another by the two turbines arranged in the exhaust gas line.

3. The gas engine according to claim 2, wherein the two turbines are arranged in series in the exhaust gas line.

4. The gas engine according to claim 1, wherein the two compressors are designed such that the charge air is compressed to 1.5 to 6 bar overpressure, while the fuel gas is compressed to a pressure which is higher by a factor of 2 to 4.

5. The gas engine according to claim 1, further comprising at least one cooler arranged between one of the two compressors and the mixing unit, wherein the at least one cooler is a charge air cooler arranged between the one of the two compressors and the mixing unit in a charge air line, a fuel gas cooler arranged between the one of the two compressors and the mixing unit in a fuel gas line, and/or a mixture cooler between the mixing unit and the at least one combustion chamber.

6. The gas engine according to claim 1, wherein the gas engine operates with a stoichiometric or over- or under-stoichiometric mixture, and wherein a controller is provided to control the mixing unit such that a desired air/fuel mixture results.

* * * * *